United States Patent
Petrovic et al.

(10) Patent No.: US 7,327,360 B2
(45) Date of Patent: Feb. 5, 2008

(54) HAIR RENDERING METHOD AND APPARATUS

(75) Inventors: Lena Petrovic, Oakland, CA (US);
John R. Anderson, San Anselmo, CA (US)

(73) Assignee: Pixar, Emeryville, CA (US)

( * ) Notice: Subject to any disclaimer, the term of this patent is extended or adjusted under 35 U.S.C. 154(b) by 49 days.

(21) Appl. No.: 11/187,432

(22) Filed: Jul. 22, 2005

(65) Prior Publication Data

US 2005/0253842 A1 Nov. 17, 2005

Related U.S. Application Data (63) Continuation of application No. 10/439,283, filed on May 14, 2003, now Pat. No. 7,098,910.

(51) Int. Cl.
*G06T 15/00* (2006.01)

(52) U.S. Cl. .............. 345/419; 345/420; 345/423; 345/424; 345/426; 345/581; 345/582

(58) Field of Classification Search .............. 345/419, 345/420, 424, 426, 581, 582, 423
See application file for complete search history.

(56) References Cited

U.S. PATENT DOCUMENTS

| | | | |
|---|---|---|---|
| 4,866,612 A | 9/1989 | Takagi et al. | |
| 4,914,589 A | 4/1990 | Crawford | |
| 5,644,689 A | 7/1997 | Ban et al. | |
| 5,758,046 A | 5/1998 | Rouet et al. | |
| 5,764,233 A * | 6/1998 | Brinsmead et al. | 345/419 |
| 5,777,619 A | 7/1998 | Brinsmead | |
| 5,793,375 A | 8/1998 | Tanaka | |
| 6,040,835 A | 3/2000 | Gibson | |
| 6,559,849 B1 | 5/2003 | Anderson et al. | |
| 6,600,487 B1 | 7/2003 | Henn et al. | |
| 6,720,962 B1 | 4/2004 | Alter | |

OTHER PUBLICATIONS

Gibson "Using Distance Maps for Accurate Surface Representation in Sampled Volumes", IEEE, 1998, pp. 23-30.*
Kim et al. "A Thin Shell Volume for Modeling Human Hair", IEEE, 2000, pp. 104-111.*
Breen et al., "3D Scan Conversion of CSG Models into Distance Volumes", California Institute of Technology, University of Tennessee, Knoxville.

(Continued)

*Primary Examiner*—Kimbinh T. Nguyen
(74) *Attorney, Agent, or Firm*—Townsend and Townsend and Crew LLP (57) ABSTRACT

A method for rendering a plurality of geometrically thin objects in a computer system includes receiving a plurality of points associated with each of the plurality of geometrically thin objects, determining a plurality of volumetric point densities associated with the plurality of geometrically thin objects in response to the plurality of points, determining a plurality of volumetric point density gradients in response to the plurality of volumetric point densities, determining a plurality of surface normals associated with at least a subset of points in response to the plurality of volumetric point density gradients, and performing a rendering operation for the subset of points in response to the plurality of surface normals.

24 Claims, 8 Drawing Sheets

OTHER PUBLICATIONS

Drebin et al, "Volume Rendering", 1988, pp. 65-74, ACM-0-89791-275.

Huang et al., "A Complete Distance Field Representation", Computer and Information Science, The Ohio State University, Columbus, OH.

Jones et al., "Shape Representation Using Space Filled Sub-Voxel Distance Fields", Department of Computer Science, University of Wales, Swansea, Singleton Park, Swansea, United Kingdom.

Jones, "The Production of Volume Data from Triangular Meshes Using Voxelisation", vol. 15, 1996, No. 5, pp. 311-318.

Kajiya et al., "Rendering Fur with Three Dimensional Textures", 1989, pp. 271-280, ACM-0-89791-312.

Kim et al., "Interactive Multiresolution Hair Modeling and Editing", 2002, pp. 620-629, ACM 1-58113-521.

Lokovic et al., "Deep Shadow Maps", 2000, pp. 385-392, ACM 2000-1-58113-208.

Perlin et al., "Hypertexture", 1989, pp. 253-261, ACM-0-89791-312.

Satherly et al., "Hybrid Distance Field Computation", University of Wales, Swansea, Singleton Park, Swansea, SA2 8PP, United Kingdom.

Sethian, "Level Set Methods and Fast Marching Methods, Evolving Interfaces in Computational Geometry, Fluid Mechanics, Computer Vision, and Materials Science", Cambridge University Press, 1999, downloaded from http://math.berkeley.edu/~sethia/level_set.html.

* cited by examiner

HAIR RENDERING METHOD AND APPARATUS

CROSS-REFERENCES TO RELATED APPLICATIONS

The present invention is a continuation of U.S. application Ser. No. 10/439,283 Filed May 14, 2003, now U.S. Pat. No. 7,098,910, and incorporates by reference for all purposes the following co-pending patent applications "Shot Rendering Method and Apparatus," U.S. application Ser. No. 10/428,321 Filed Apr. 30, 2003 and "Method and Apparatus for Rendering of Translucent Objects Using Volumetric Grids," U.S. application Ser. No. 10/428,322 Filed Apr. 30, 2003.

BACKGROUND OF THE INVENTION

The present invention relates to computer animation. More particularly, the present invention relates to techniques and apparatus for efficient rendering of hair on objects.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and physical animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Physical-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Physical animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment physical animation techniques. For example, physical models could be represented by virtual models in computer memory, and manipulated.

One of the pioneering companies in the computer aided animation (CA) industry was Pixar. Pixar developed both computing platforms specially designed for computer animation and animation software now known as Render-Man®. RenderMan® was particularly well received in the animation industry and recognized with two Academy Awards®.

RenderMan® software is used to convert graphical specifivations of objects and convert them into one or more images. This technique is known in the industry as rendering. One specific portion of the rendering process is known as surface shading. In the surface shading process, the surface shader software determines how much light is directed towards the viewer from the surface of objects in an image in response to the applied light sources. Two specific parameters that are used for shading calculations includes a surface normal and a surface illumination.

The surface shading process is quite effective for coherent surfaces where there are smoothly varying surface properties. However, this process is not effective for shading hair, because hair is typically a large collection of infinitely thin curves (one-dimensional) that have little physical relation to neighboring hairs. Further, this process is not effective because unlike standard surfaces, hair does not have a well-defined surface normal.

Hair illumination processes have been proposed to solve the problem of illuminating a one dimensional hair in a three dimensional world. One such process has included the use of tangent-based lighting response to determine hair illumination, and the use of deep shadows for self-shadowing.

Drawbacks to tangent-based illumination solutions include that this method often leads to visually distracting artifacts. That is, viewers typically expect hair to have smooth illumination across neighboring hairs, but with this method, there is no hair to hair lighting coherency, thus hair will "sparkle" or "pop" to a viewer. Another drawback is that unrelated hairs that are spatially far apart may erroneously have the same lighting response. For example, in the case of back-lit head, if a hair on the front of a head and a hair on back of the head have the same tangent, they will have the same illumination. As a result, even though the head is supposed to be silhouetted, hairs on the front the head will be still be illuminated.

Drawbacks to the use of deep shadows for hair self-shadowing include that they are computationally intensive, and they are inflexible. As is known, deep shadows maps are computed separately for each illumination source, and for a specific illumination position. If an animator decides to change the position of the camera, the entire deep shadow map for that illumination source will need to be recomputed. Yet another drawback is that because hair is computationally expensive to shade, a hair model having fewer hairs may used. However, if the hair is back-lit, the thinness of the hair model will be apparent to a viewer.

In light of the above, what is needed are improved techniques to render hair without the visual problems described above.

BRIEF SUMMARY OF THE INVENTION

The present invention relates to the field of computer animation. More particularly, the present invention relates to improved techniques and apparatus for rendering hair.

According to an aspect of the present invention, a method for rendering a plurality of hair objects is described. The method may include determining a bounding object including a plurality of voxels and a plurality of vertices, wherein the plurality of voxels bound the plurality of hair objects, determining hair density values associated with each of the plurality of vertices, and spatially smoothing the hair density values associated with each of the plurality of vertices to form smoothed density values associated with each of the plurality of vertices. Techniques may also include identifying a group of vertices from the plurality of vertices having associated smoothed density values approximately equal to a desired surface density value, the group of vertices defining a hair shell surface, and determining a distance field value for each of the plurality of vertices with respect to the hair shell surface. The method may also include determining a set of surface normal directions associated with a set of vertices associated with a voxel, in response to at least a portion of the distance field values for the plurality of vertices, and determining a surface normal direction for a hair particle within the voxel in response to the set of surface normal directions associate with the set of vertices. A first hair particle illumination value in response to a first illumination source can be determined, and the hair particle may be shaded using the hair particle illumination value and the surface normal direction for the hair particle.

According to another aspect of the invention, a computer program product for rendering a plurality of hair objects on computer system including a processor is described. The computer program product is on a tangible media that includes code that directs the processor to determine a grid including a plurality of voxels and a plurality of vertices, wherein at least a subset of the voxels bound at least a subset of the hair objects, code that directs the processor to determine a hair density value associated with each of at least a first set of vertices, and code that directs the processor to filter the hair density value associated with each vertex from at least the first set of vertices with a filter to form filtered density values. Additionally, the tangible media includes code that directs the processor to identify a group of vertices having associated filtered density values no greater than a desired surface density value, wherein some of the group of vertices are used to define a hair shell surface, code that directs the processor to calculate a distance field value for a second set of vertices with respect to the hair shell surface, and code that directs the processor to determine a set of surface normal directions associated with vertices associated with a voxel, in response to a set of distance field values for the second set of vertices. The media may include code that directs the processor to determine a surface normal direction for a hair particle within the voxel in response to the set of surface normal directions, and code that directs the processor to determine a first hair particle illumination value in response to a first illumination source. The tangible media may be a hard disk drive, volatile memory, an optical memory, or the like. A shader subsequently receives the first hair particle illumination value and the surface normal direction for the hair particle to determine the surface shading of the hair particle.

According to yet another aspect of the invention, a computer system for rendering a plurality of hair objects is described to include a memory and a processor. In various configurations, the processor is configured to determine a grid having a plurality of voxels and a plurality of vertices, wherein hair objects comprise a plurality of hair particles, and wherein the plurality of hair particles are located within a group of voxels, the processor is configured to determine hair particle density values associated with vertices associated with the group of voxels, and the processor is configured to spatially smooth the hair particle density values across the vertices associated with the group of voxels. In various embodiments, the processor is also configured to solve a distance function for a first set of vertices to form a distance field in response to the hair particle density values, wherein a distance function returns zero at a pre-determined hair particle density, and configured to determine a surface normal direction for a hair particle within a voxel in response to the distance field. The processor may also be configured to determine a first hair particle illumination value in response to a first illumination source, and the processor may be configured to determine a shading value for the hair particle using the hair particle illumination value and the surface normal direction for the hair particle.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
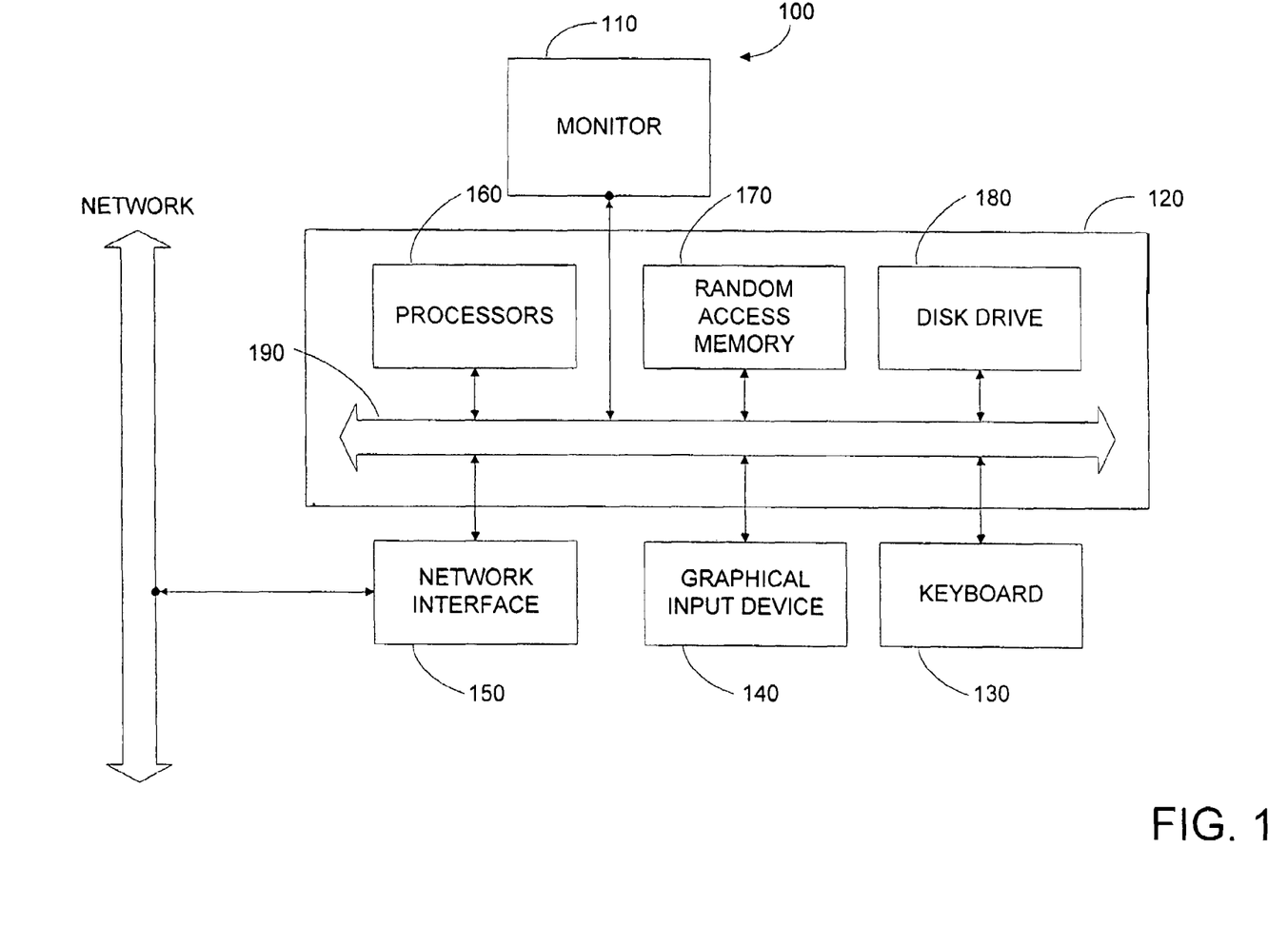
FIG. 1 illustrates a block diagram of a rendering system according to one embodiment of the present invention.

FIG. 1 is a block diagram of typical computer rendering system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having multiple microprocessors such as Xeon™ microprocessor from Intel Corporation. Further, in the present embodiment, computer 120 typically includes a UNIX-based operating system.

RAM 170 and disk drive 180 are examples of tangible media for storage of data, audio/video files, computer programs, applet interpreters or compilers, virtual machines, embodiments of the herein described invention including geometric description of hair, hair generation algorithms, object data files, shader descriptors, a rendering engine, output image files, texture maps, displacement maps, scattering lengths and absorption data of object materials, and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer rendering systems capable of embodying the present invention. It will be readily apparent to one of ordinary skill in the art that many other hardware and software configurations are suitable for use with the present invention. For example, the use of other micro processors are contemplated, such as Pentium™ or Itanium™ microprocessors; Opteron™ or AthlonXP™ microprocessors from Advanced Micro Devices, Inc; PowerPC G3™, G4™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

Figure 2A:
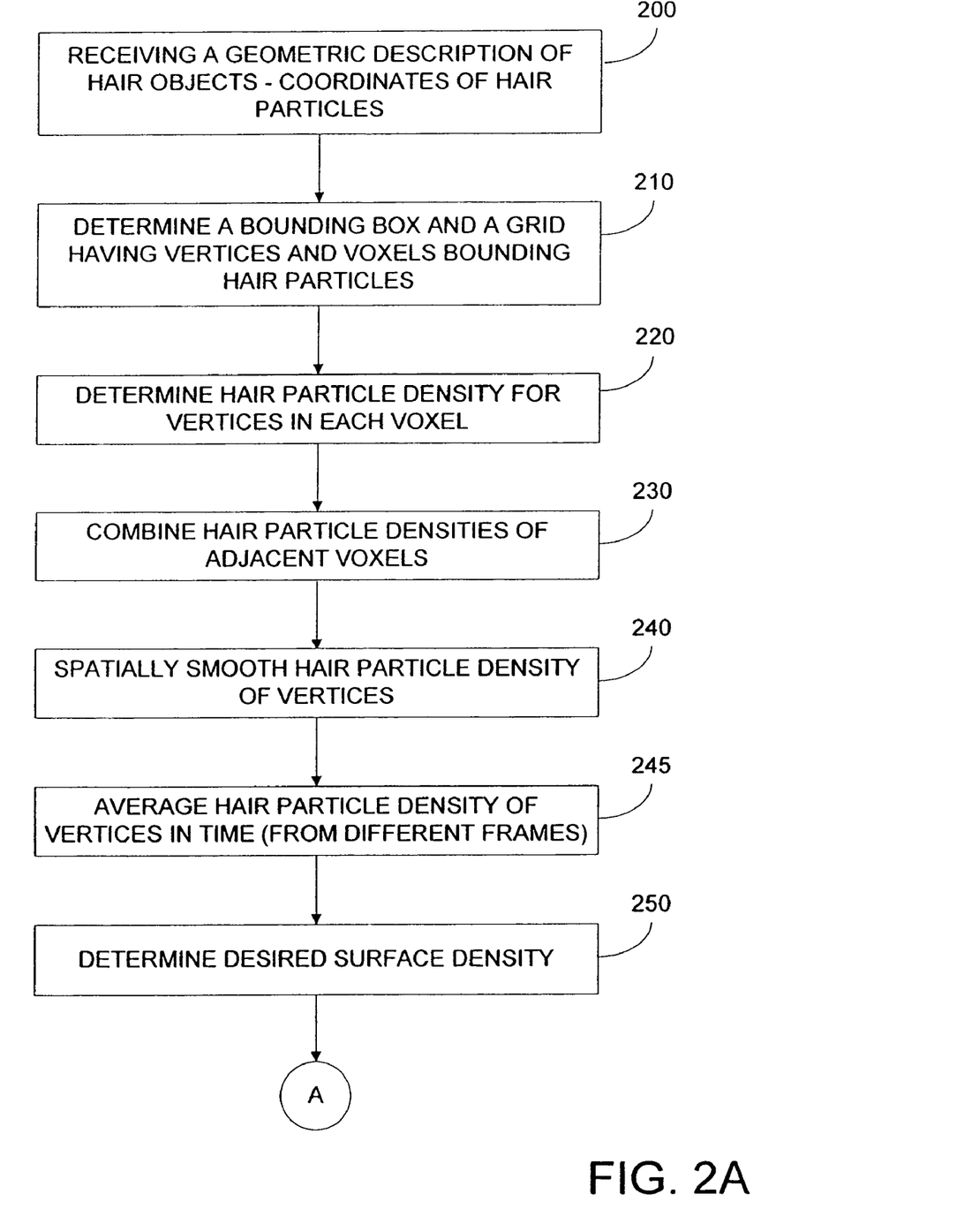
FIGS. 2A-C illustrate a block diagram of a flow process according to an embodiment of the present invention.
Figure 2B:
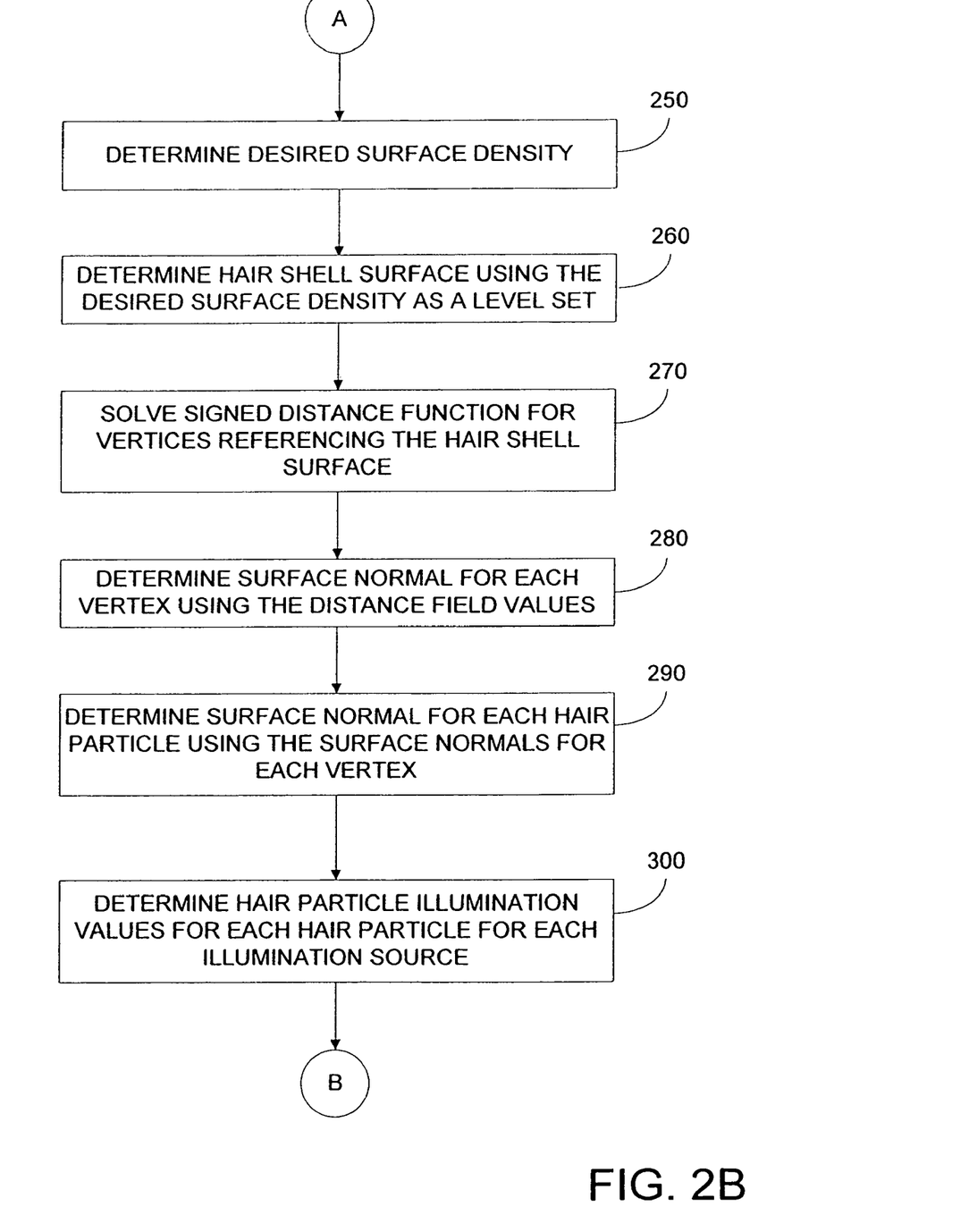
Figure 2C:
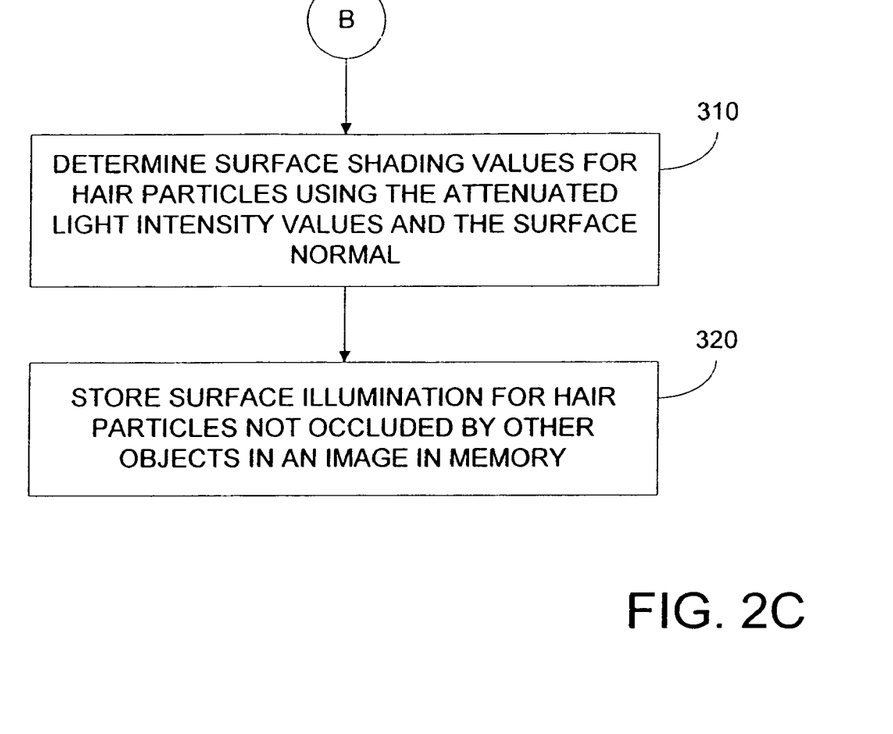

FIGS. 2A-C illustrates a block diagram of a flow process according to an embodiment of the present invention. More particularly, the block diagram discloses a process in which hair is efficiently rendered.

In one embodiment of the present invention, the process begins with the specification of hair to be rendered, step 200. In one embodiment, the geometric representation of each strand of hair may be retrieved from memory, and in another embodiment, geometric representations of strands of hair may be dynamically generated based upon hair-generation algorithms or methods.

In the present embodiment, each strand of hair is composed of a string of hair "particles." For example, a geometric description of a typical hair may include the coordinates of ten to twenty hair particles. In other embodiments, a greater or lesser number of hair particles may represent a strand of hair.

Next, an outer bounding box is constructed that bounds all of the hair particles, step 210. In this example, this step is performed by constructing a grid including voxels and vertices. In the present embodiment, the grid may include from 200 to 500 vertices per side, depending upon the shape of the hair being rendered. In other embodiments, the number of vertices may vary.

In the present embodiment, the hair particle density in each voxel is distributed to the respective vertices, step 220. An example of this process uses linear interpolation to distribute a hair particle to the vertices, although many other methods for interpolation or distribution can also be used in other embodiments.

Figure 3:
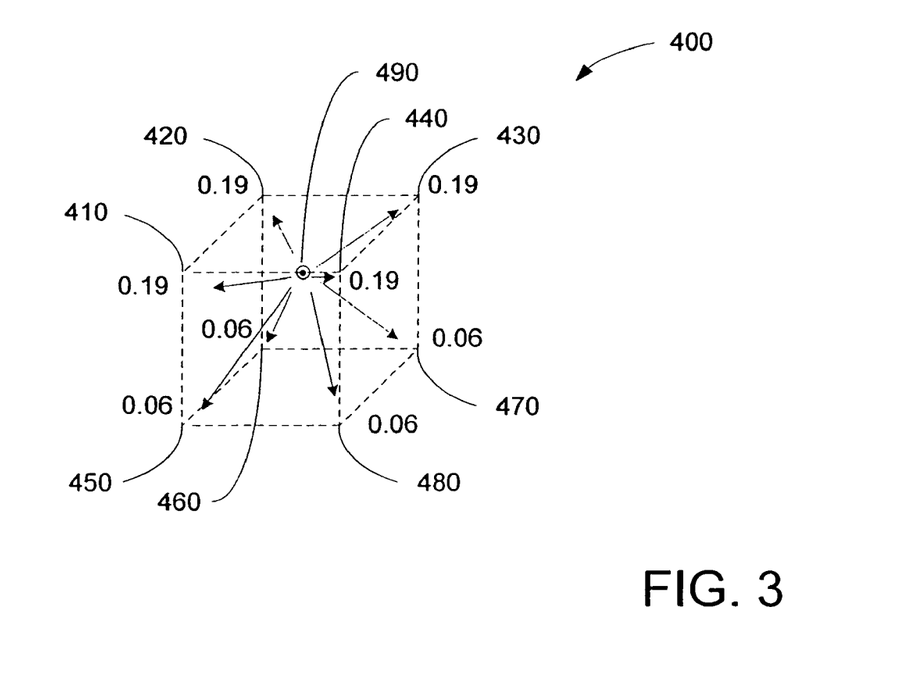
FIG. 3 illustrate an example of an embodiment of the present invention.

FIG. 3 illustrates an embodiment of the present invention. In particular, FIG. 3 illustrates a process of determining a hair density value for vertices in a voxel. In FIG. 3, a voxel 400 is illustrated having respective vertices 410-480, and a hair particle 490.

In this embodiment, the presence of hair particle 490 is distributed to vertices 410-480 based upon the location of hair particle 490 within voxel 400. In this example, hair particle 490 is located three-quarters in the z-direction of voxel 400, accordingly, vertices 410-440 are assigned 0.75 the presence of hair particle 490 and vertices 450-480 are assigned 0.25 the presence. Further, in this example, hair particle 490 located half-way in the x-direction and y-direction of voxel 400, thus vertices 410-440 evenly split the 0.75 value, and vertices 450-480 evenly split the 0.25 value. The distributed results can be seen in FIG. 3.

In the present embodiment, the distribution of the presence of a hair particle is typically repeated for all hair particles in a voxel. Mathematically, the density equation is:

$$\text{Density}(t) = (1-(P_x-x))*(1-(P_y-y))*(1-(P_z-z))$$

Where (Px,Py,Pz) are the hair particle coordinates in world space, and (x,y,z) are the cell coordinates in world space.

Returning to FIGS. 2A-C, in the present embodiment, the hair density values of vertices of adjacent voxels are then added together, step 230. As a result, each vertex is then associated with a hair density value with contributions of up to eight adjacent voxels. An example of this is illustrated in FIG. 4A.

Figure 4A:
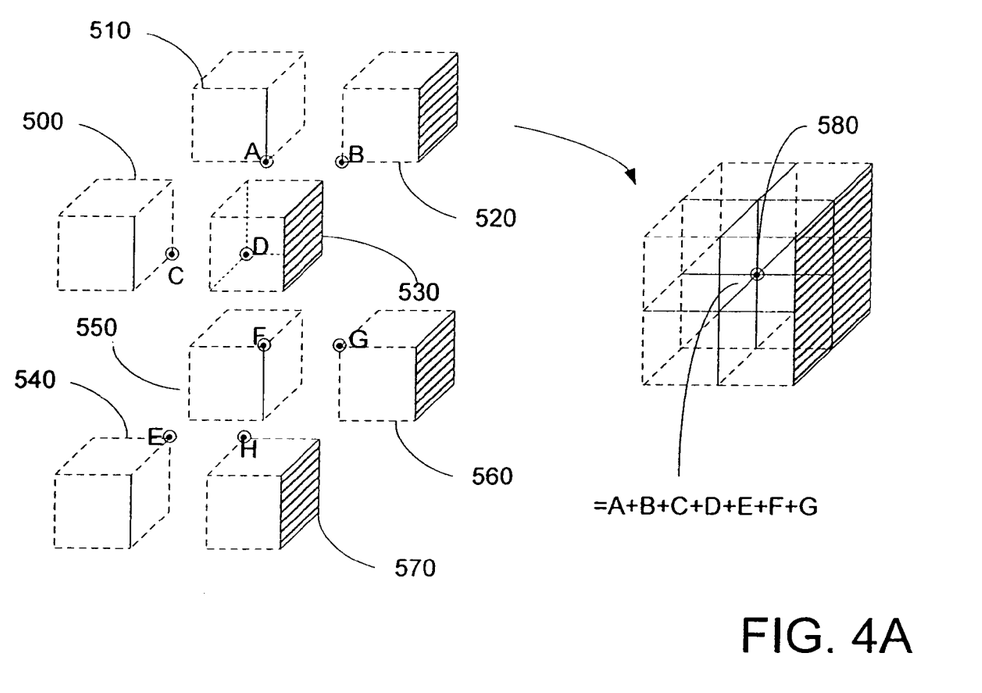
FIG. 4A illustrate an example of an embodiment of the present invention.

FIG. 4A illustrates an embodiment of the present invention. In particular, FIG. 4A illustrates a process of determining a hair density value for a vertex from adjacent voxels. In FIG. 4A, voxels 500-570 are illustrated having vertex 580 in common. As can be seen, when the hair density values are placed within the grid, the hair density value for vertex 580 is the combination of the contributions from voxels 500-570. In other embodiments, fewer than eight voxels may contribute to the hair density value, for example, for voxels on an outer surface or boundary of the grid.

Figure 5:
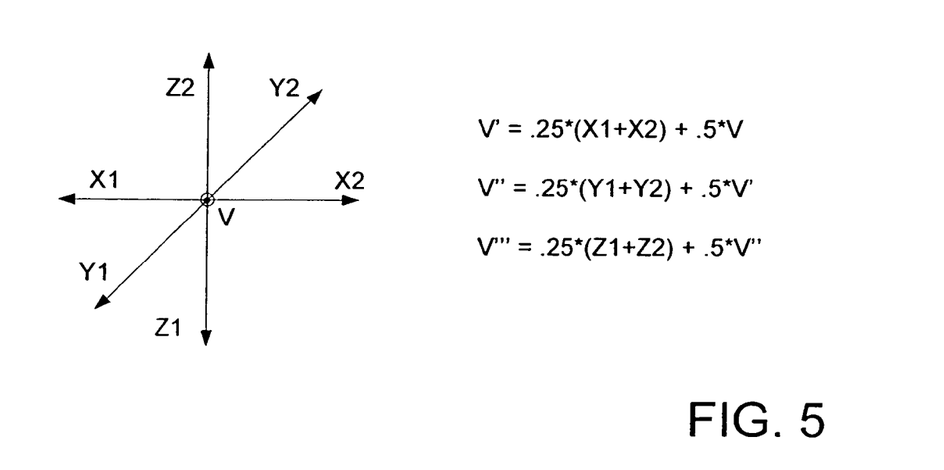
FIG. 5 illustrate an example of an embodiment of the present invention.

In FIGS. 2A-C, the next step is to perform a smoothing operation of the hair density values on the vertices, step 240. In one embodiment, a tri-linear filter is used, as illustrated in FIG. 5. In other embodiments, other types of smoothing operations may also be used, for example, a cubic filter, a tri-linear filter with different weights, a polynomial filter, and the like. As a result of this step, the hair density values for the vertices is greatly smoothed, reducing high frequencies. This reduction in high frequency reduces the potential for hair "sparkling" during shading.

In present embodiment of the present invention, the hair density value is determined within a specific time period, typically a frame. In one embodiment, hair density values for respective vertices are then averaged between frames, step 245. More specifically, a particle velocity V is introduced into the density equation. In one example, the equation becomes:

$$\text{Density}(t) = \alpha*[(1-(P_x-x))*(1-(P_y-y))*(1-(P_z-z))] + (1-\alpha)*[(1-(P_x-x))*(1-(P_y-y))*(1-(P_z-z))]$$

In other embodiments, the hair density values are averaged with a previous frame, and a next frame (e.g. 25% previous, 50% current, 25% next). As a result of this step, a more coherent topology for the hair density values is provided between adjacent frames. This process virtually eliminates the "sparkling" or "popping" appearance of hair between different images.

In the present embodiment, a desired surface density is then determined, step 250. In one embodiment of the present invention, the desired surface density may be determined by an animator ahead of time or during the animation process. In other embodiments, the desired surface density may be automatically determined based upon a variety of factors including the hair density value distribution (e.g. desired surface density encompass 90% of the hair particles), or the like. In some embodiments of the present invention, the desired surface density may be within a range of values.

In this embodiment, the desired surface density is used to determine a hair shell surface, step 260. The hair shell surface is used in embodiments below to help determine normal directions. In embodiments of the present invention, hair shell surface is determined by comparing the hair density values of the vertices closest to the edge of the bounding box to the desired surface density. If the hair density values do not exceed the desired surface density, the hair density values of the next inward vertices and examined, and so on, until vertices having the desired surface density are identified. These identified vertices then form the hair shell surface.

In other embodiments, steps 250 and 260 may not be performed, and the outer bounding box is used for the hair shell surface.

Figure 6:
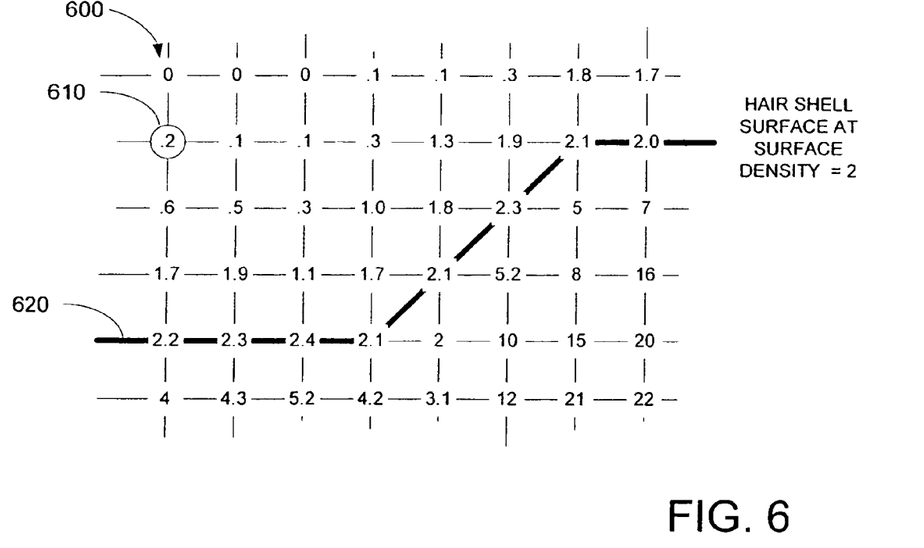
FIG. 6 illustrate an example of an embodiment of the present invention.

FIG. 6 illustrates an embodiment of the present invention. In this two-dimensional example, a number of vertices 600 are illustrated, each having a respective hair density value 610. As can be seen, hair density values 610 typically vary, with higher hair density values towards the surface of the object. In this example, the desired surface density is set by an animator to "2." Thus as shown, a two-dimensional hair shell surface 620 is formed. Hair shell surface 620 may be automatically or manually adjusted to account for unexpected low hair density values below hair shell surface 620. In the present embodiment, the hair shell surface is typically a three-dimensional surface.

In the embodiment illustrated in FIGS. 2A-C, the next step is determining a distance field with respect to the hair shell surface, step 270. Mathematically, the present embodiment relies upon a signed distance field having the following relationships:

$$|\nabla SignedDistance|=1$$

SignedDistance=0 at the desired surface density.

When particle velocity V is included, the following additional relationship applies:

$$d(SignedDistance)/dt=V$$

In this embodiment, a new grid is formed, and the vertices of the grid are assigned a scalar value representing the shortest distance to the hair shell surface. In this example, the new grid is typically of the same spacing as the grid used for the hair density values, above, although in other embodiments, the grid may have a different spacing. In yet another embodiment, only one grid is allocated, and the hair density values and the scalar values are associated with each vertex in a grid.

Figure 7:
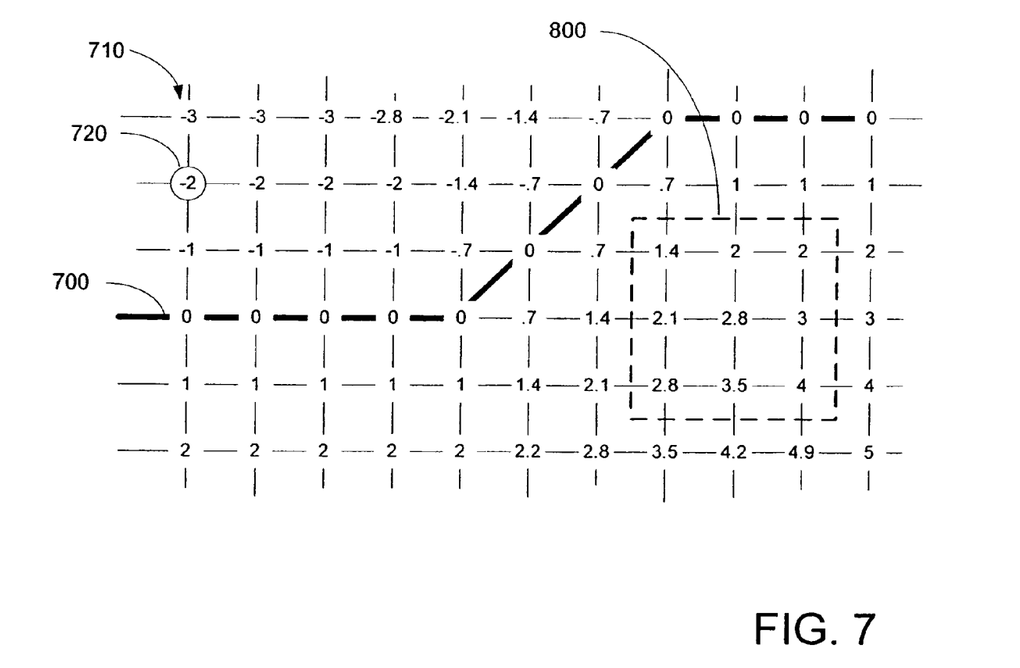
FIG. 7 illustrate an example of an embodiment of the present invention.

FIG. 7 illustrates an embodiment of the present invention. FIG. 7 includes a hair shell surface 700, a number of vertices 71 0, and scalar distance values 720 for vertices 710.

In this two-dimensional example, hair shell surface 700 may be formed according to the process described above. For example, referring to FIG. 6, hair shell surface 700 is set to be the location where the hair surface density was at least equal to two, in FIG. 6. As discussed above, hair shell surface 700 may be set to be at any other desired surface density.

In this example, scalar distance values 720 represent the smallest distance between a vertex location and hair shell surface 700. This distance may be signed in various embodiments, with positive values inside the hair shell and negative values outside the hair shell. Embodiments may be applied to two-dimensional or three-dimensional hair shell surfaces.

In the present embodiment, the next step in FIGS. 2A-C is the determination of a surface normal for each vertex, step 280. In this embodiment, the surface normal is defined as the direction of the shortest distance to the hair shell surface. The surface normal for each vertex can easily be determined by comparing the scalar distance values of adjacent vertices. Mathematically, the equation is as follows:

Surface Normal=($d$(SignedDistance)/$d$($x$), $d$(SignedDistance)/$d$($y$), $d$(SignedDistance)/$d$($z$))

Figure 8:
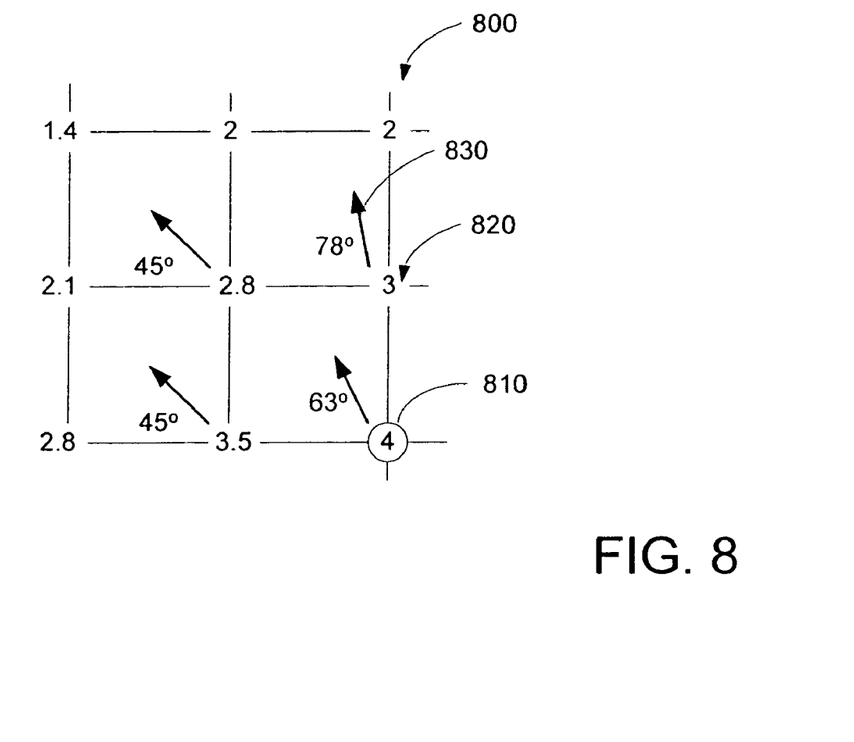
FIG. 8 illustrate an example of an embodiment of the present invention.

FIG. 8 illustrates an embodiment of the present invention. Continuing the two-dimensional example of FIG. 7, vertices 800 are illustrated in detail and the scalar distance values 810 of vertices 800.

In this example, in the x-direction, the change in scalar distance values for vertex 820 towards the surface is 0.2 (3−2.8=0.2). Further, in the y-direction, the change in scalar distance values towards the surface is 1 (3−2=1). Accordingly, the surface normal 830 has a x component of 0.2 and a y component of 1. Using simple trigonometry, this corresponds to a surface normal of approximately 78 degrees, as shown.

Next, in FIGS. 2A-C, a surface normal for each hair particle is determined, step 290. In the present embodiment, the location of each hair particle in a voxel is interpolated using the surface normals of the vertices in the voxel. The surface normals for each hair particle is then used in the shading process, described later below.

Figure 9:
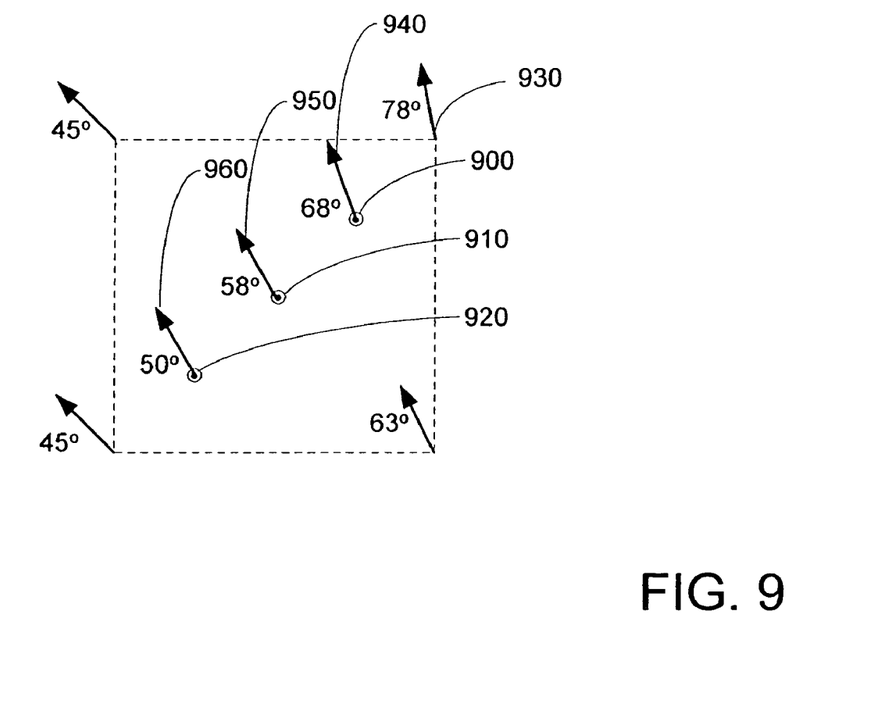
FIG. 9 illustrate an example of an embodiment of the present invention.

FIG. 9 illustrates an embodiment of the present invention. In particular, FIG. 9 illustrates a two-dimensional example including hair particles 900, 910 and 920 within a voxel 930. Additionally, the surface normals 940-960 are illustrated.

In this example, surface normals of hair particles are dependent upon the position of hair particles 900-920 within voxel 930. In this example, hair particle 910 is in the middle of voxel 930. Accordingly, a surface normal 950 is simply the average of the surface normals, as shown. Further, the surface normals 940 and 960 are the respective weighted averages of the surface normals, as shown.

As a result of this process, neighboring hair particles have smoothly varying surface normals that results in coherent hair to hair illumination.

In the example in FIGS. 2A-C, the attenuated light intensity at each hair particle is determined with respect to each light source, step 300. One embodiment of the present invention relies upon a simple light attenuation relationship as follows:

hair particle attenuated light intensity=bounding box surface light intensity/(1+length ($Pe$−$P$))

Figure 10:
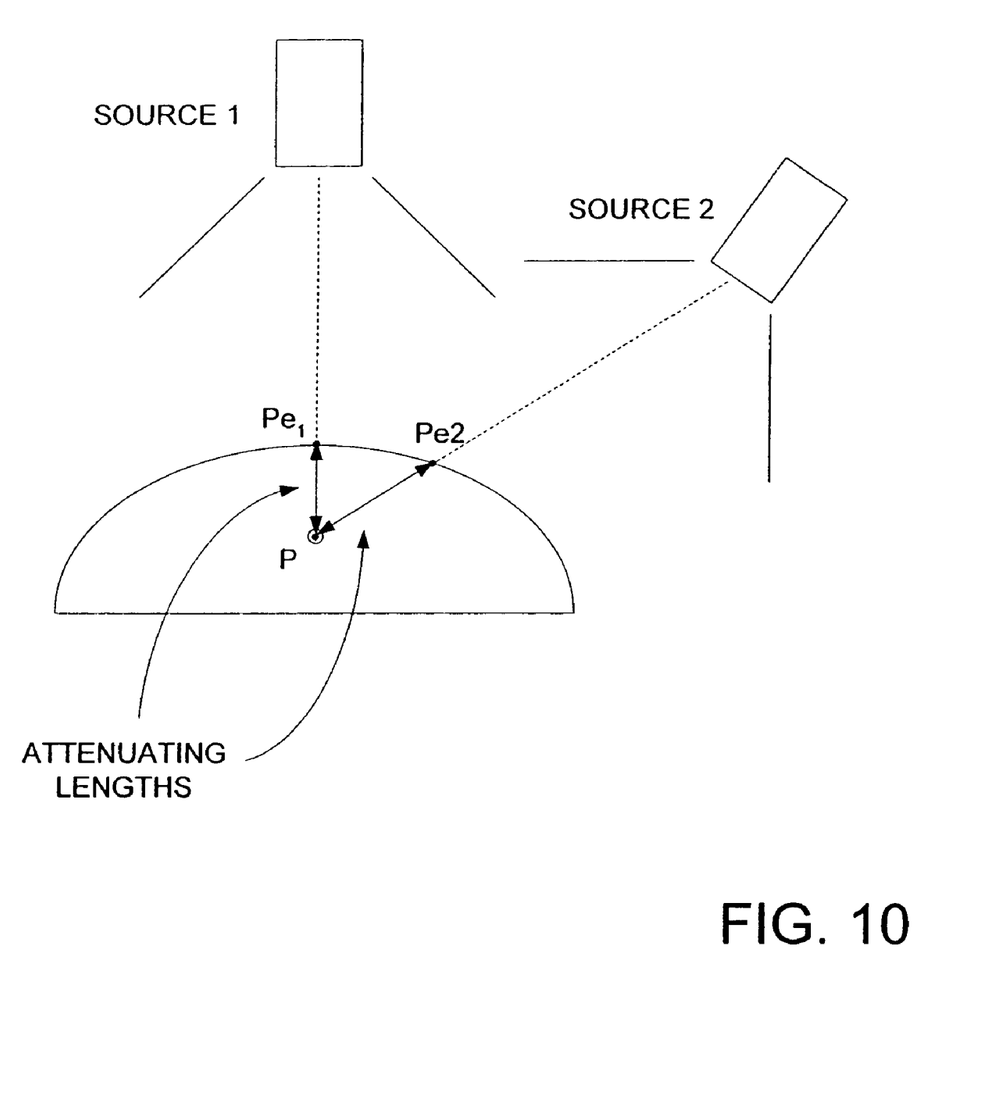
FIG. 10 illustrates another example of an embodiment of the present invention.

In this equation, P is the hair particle point of interest, and Pe is the point of entry of illumination from an illumination source towards P. Length(Pe, P) is a function that determines the distance between Pe and P. An example of this is illustrated in FIG. 10. In the present embodiment, an attenuated light intensity is determined for each separate illumination source and for each hair particle.

In this embodiment, the attenuation of the light intensity is assumed to be approximately uniform. However, in other embodiments of the present invention, more complex attenuation relationships may be implemented. For example, extinction values described in the co-pending U.S. patent application referred to above, may be calculated for the present grid vertices. Based upon the extinction values and the surface light intensity, a more accurate determination of the hair particle surface illumination can be determined. For example, such an embodiment would illustrate that hair that is less dense admits more light to a particular hair particle than hair that is more dense. In other embodiments of the present invention, this process is performed separately for each of the primary color components (red, green, and blue.) Such cases are useful when the hair has different extinction and/or attenuation and scattering properties for the component colors.

In the present embodiment illustrated in FIGS. 2A-C, for each hair particle, the surface normal, and attenuated light intensity values from each illumination source are entered into a surface shader. The shader result is a surface shading value of the hair particle in response to the different illumination sources in the direction of the viewer, step 310. In embodiments of the present invention, it is envisioned that a great number of shaders currently compatible with RenderMan® could be used to implement the above techniques. If the hair particle is not occluded by another object, the surface shading value of the hair particle is typically recorded within an image. The image is then stored to memory, step 320

In the foregoing specification, the invention has been described with reference to specific exemplary embodiments thereof. Many changes or modifications are readily envisioned. For example, the hair particle surface illumination from each light source may be attenuated in a variety of methods including, assuming a uniformly attenuating media, and compensating for non-uniformly attenuating media, and the like.

In embodiments of the present invention, the inventors have determined that advantages of the present schema may be applied to the shot rendering techniques described in the above-referenced U.S. patent applications. In particular, the present embodiments can provide great time savings to an animator when "bracketing" using shot rendering techniques, as described in that application. As an example of bracketing is where all rendering parameters and illumination parameters remain constant, but the shot is rendered from different camera angles or positions. In such an example, the majority of the steps described in FIGS. 2A-C need not be repeated, and only portions of the final shading step need to be repeated to account for the different camera position. This provides a tremendous time savings in the rendering process. In contrast, using the deep shadow maps described above, when the camera position moves, the deep shadow map must be entirely recomputed for each light source.

Embodiments of the present invention may be applied to any number of rendering platforms and for a variety of purposes. For example, embodiments may be use on engineering workstations for development purposes, on visualization systems for artists and animators, in a rendering farm machine for final production, and the like. Accordingly, the concepts disclosed above are extremely valuable in a variety of applications.

It is believed that images that include hair rendered according to the above-described techniques appear more naturally than any previous hair rendering technique while at the same time providing hair to hair coherency. Additionally, a sequence of images rendered according to these techniques do not have the hair "pop" or "sparkle" associated with previous techniques of rendering hair. This is due, in part to the compensation for hair particle velocity, described above. Further, the images rendered herein provide a great degree of hair to hair coherency, without resorting to a static "hair cap" as was also previously used. In light of the above, hair rendered according to the above technique are visually superior to hair rendered using existing hair rendering techniques.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for rendering a plurality of objects in a computer system comprises:
    determining a plurality of optical densities associated with the plurality of objects;
    determining a plurality of surface normals for at least a subset of objects of the plurality of objects in response to the plurality of optical densities associated with the plurality of objects; and
    performing a rendering operation on at least the subset of the objects in response to the plurality of surface normals for at least the subset of objects.

2. The method of claim 1 wherein determining the plurality of surface normals comprises:
    defining at least one uniform optical density surface in response to the plurality of optical densities associated with the plurality of objects; and
    determining the plurality of surface normals for at least the subset of objects in response to the at least one uniform optical density surface.

3. The method of claim 2
    wherein the plurality of objects comprise a plurality of geometrically thin objects; and
    wherein the plurality of optical densities comprises a number of geometrically thin objects per unit volume.

4. The method of claim 3 wherein the plurality of geometrically thin objects represent hair.

5. The method of claim 1 wherein determining the plurality of surface normals comprises:
    determining a signed distance function associated with at least the subset of objects in response to the plurality of optical densities associated with the plurality of objects;
    determining a plurality of gradients associated with at least the subset of objects in response to the signed distance function; and
    determining the plurality of surface normals for at least the subset of objects in response to the plurality of gradients.

6. The method of claim 5 further comprising:
    defining at least one uniform optical density surface in response to the plurality of optical densities associated with the plurality of object;
    wherein the plurality of surface normals for at least the subset of objects are directed in a direction towards the at least one uniform optical density surface.

7. The method of claim 5
    wherein the plurality of objects are represented by a plurality of particles; and wherein the plurality of optical densities comprises a number of particles per unit volume.

8. The method of claim 1 wherein performing the rendering operation on at least the subset of the objects comprises:
performing the rendering operation on at least the subset of the objects to determine a plurality of shading values for at least the subset of objects in response to the plurality of surface normals for at least the subset of objects;
determining an image in response to the plurality of shading values; and
storing a representation of the image in a tangible media.

9. The tangible media storing the representation of the image formed according to the method of claim 8.

10. A computer program product for rendering a plurality of objects in a computer system including a processor includes:
code that directs the processor to determine a plurality of volumetric object densities associated with the plurality of objects;
code that directs the processor to determine a plurality of surface normal directions for at least a subset of objects from the plurality of objects in response to the plurality of volumetric object densities associated with the plurality of objects; and
code that directs the processor to perform a rendering operation on at least the subset of the objects in response to the plurality of surface normal directions for at least the subset of objects;
wherein the codes reside on a tangible media.

11. The computer program product of claim 10 wherein code that directs the processor to determine the plurality of surface normal directions comprises:
code that directs the processor to define a uniform volumetric object density surface in response to the plurality of volumetric object densities associated with the plurality of objects; and
code that directs the processor to determining the plurality of surface normal directions for at least the subset of objects in response to the uniform volumetric object density surface.

12. The computer program product of claim 11
wherein the plurality of objects comprise a plurality of geometrically thin objects; and
wherein the plurality of volumetric object densities comprises a number of geometrically thin objects per unit volume.

13. The computer program product of claim 12 wherein the plurality of geometrically thin objects represent hair objects.

14. The computer program product of claim 10 wherein determining the plurality of surface normal directions comprises:
determining a signed distance function associated with at least the subset of objects in response to the plurality of volumetric object densities associated with the plurality of objects;
determining a plurality of gradients associated with at least the subset of objects in response to the signed distance function; and
determining the plurality of surface normal directions for at least the subset of objects in response to the plurality of gradients.

15. The computer program product of claim 14 further comprising:
defining a uniform volumetric object density surface in response to the plurality of volumetric object densities associated with the plurality of objects;
wherein the plurality of surface normal directions for at least the subset of objects are directed in a direction towards the one uniform volumetric object density surface.

16. The computer program product of claim 11
wherein the plurality of objects are represented by a plurality of particles; and
wherein the plurality of volumetric object densities comprises a number of particles per unit volume.

17. The computer program product of claim 10 wherein code that directs the processor to perform code that directs the processor to perform the rendering operation comprises:
code that directs the processor to perform the rendering operation on at least the subset of the objects to determine a plurality of shading values for at least the subset of objects in response to the plurality of surface normal directions;
code that directs the processor to determine an image in response to the plurality of shading values; and
code that directs the processor to store a representation of the image in a tangible media.

18. An article of manufacture comprises:
a tangible media storing a representation of an image determined in response to a plurality of shading values associated with a plurality of three-dimensional objects referenced in a scene descriptor;
wherein the plurality of shading values associated with the plurality of three-dimensional objects are determined in response to a plurality of surface normal directions associated with the plurality of three-dimensional objects;
wherein the plurality of surface normal directions associated with the plurality of three-dimensional objects are determined in response to a plurality of volumetric densities associated with the plurality of three-dimensional objects;
wherein the plurality of volumetric densities associated with the plurality of three dimensional objects are determined in response to a specification of locations of the plurality of three-dimensional objects.

19. The article of manufacture of claim 18
wherein the plurality of surface normal directions associated with the plurality of three-dimensional objects are determined in response to a uniform volumetric density surface; and
wherein the uniform volumetric density surface is determined in response to the plurality of volumetric densities associated with the plurality of three-dimensional objects.

20. The article of manufacture of claim 19
wherein the plurality of three-dimensional objects comprise a plurality of geometrically thin objects; and
wherein the plurality of volumetric densities comprises a number of geometrically thin objects per unit volume.

21. The article of manufacture of claim 20 wherein the plurality of geometrically thin objects represent hair objects.

22. The article of manufacture of claim 18
wherein the plurality of surface normal directions associated with the plurality of three-dimensional objects are determined in response to a plurality of gradients associated with the plurality of three-dimensional objects;

wherein the plurality of gradients are determined in response to a signed distance function associated with the plurality of three-dimensional objects; and wherein the signed distance function is determined in response to the plurality of volumetric densities associated with the plurality of three-dimensional objects.

23. The article of manufacture of claim 22 further comprising:

wherein the plurality of surface normal directions associated with the plurality of three-dimensional objects are directed in a direction towards a uniform volumetric density surface;

wherein the uniform volumetric optical density surface is determined in response to the plurality of volumetric densities associated with the plurality of three-dimensional objects.

24. The article of manufacture of claim 18 wherein the plurality of three-dimensional objects are represented by a plurality of particles; and wherein the plurality of volumetric densities comprises numbers of particles per unit volume.

* * * * *